US008768778B2

(12) United States Patent
Smith

(10) Patent No.: US 8,768,778 B2
(45) Date of Patent: Jul. 1, 2014

(54) EFFECTING AN ELECTRONIC PAYMENT

(75) Inventor: Glyn Barry Smith, Chesterfield (GB)

(73) Assignee: Boku, Inc., San Francisco, CA (US)

( * ) Notice: Subject to any disclaimer, the term of this patent is extended or adjusted under 35 U.S.C. 154(b) by 623 days.

(21) Appl. No.: 11/824,607

(22) Filed: Jun. 29, 2007

(65) Prior Publication Data

US 2009/0006217 A1   Jan. 1, 2009

(51) Int. Cl.
*G06Q 30/06* (2012.01)
(52) U.S. Cl.
CPC ............ *G06Q 30/06* (2013.01); *G06Q 30/0601* (2013.01); *G06Q 30/0613* (2013.01); *G06Q 30/0633* (2013.01); *G06Q 30/0635* (2013.01)
USPC ........ 705/26; 705/26.1; 705/26.41; 705/26.8; 705/26.81
(58) Field of Classification Search
CPC ... G06Q 30/06; G06Q 3/061; G06Q 30/0613; G06Q 30/0633; G06Q 30/0635
USPC .......................................................... 705/26
See application file for complete search history.

(56) References Cited

U.S. PATENT DOCUMENTS

| | | |
|---|---|---|
| 5,283,829 A | 2/1994 | Anderson |
| 5,708,422 A | 1/1998 | Blonder et al. |
| 5,845,260 A | 12/1998 | Nakano et al. |
| 5,905,873 A | 5/1999 | Hartmann et al. |
| 5,914,472 A | 6/1999 | Foladare et al. |
| 5,945,653 A | 8/1999 | Walker et al. |
| 5,953,710 A | 9/1999 | Fleming |
| 6,227,447 B1 | 5/2001 | Campisano |
| 6,282,276 B1 | 8/2001 | Felger |
| 6,302,326 B1 | 10/2001 | Symonds et al. |
| 6,473,808 B1 | 10/2002 | Yeivin et al. |
| 6,612,488 B2 | 9/2003 | Suzuki |
| 6,704,409 B1 | 3/2004 | Dilip et al. |
| 6,718,178 B1 | 4/2004 | Sladek et al. |
| 6,732,919 B2 | 5/2004 | Macklin et al. |
| 6,788,771 B2 | 9/2004 | Manto |

(Continued)

FOREIGN PATENT DOCUMENTS

| | | |
|---|---|---|
| GB | 2379525 | 3/2003 |
| JP | 2007109014 | 4/2007 |

(Continued)

OTHER PUBLICATIONS

Amazon.com, Inc., "Get Gold Box Deals Every Day with Amazon Text Alerts," located at http://www.amazon.com/gp/anywhere/sms/goldbox, available at least by Jun. 10, 2009.

(Continued)

*Primary Examiner* — James A Vezeris
*Assistant Examiner* — Clifford Madamba
(74) *Attorney, Agent, or Firm* — Stephen M. De Klerk

(57) ABSTRACT

Effecting an electronic payment from customers to vendors over the Internet is disclosed. A vendor offers a product to potential customer over the Internet. A customer browsers the Internet and the customer has a mobile cellular phone configured to receive premium rate mobile terminating text messages. Transaction details are transmitted from the vendor to the browsing customer. Order details are then transmitted from the browsing customer to the vendor that require a payment to be made by the customer. In order to effect payment, a plurality of premium rate text messages are transmitted to the mobile cellular phone.

24 Claims, 10 Drawing Sheets

(56) References Cited

U.S. PATENT DOCUMENTS

| | | |
|---|---|---|
| 6,807,410 B1 | 10/2004 | Pailles et al. |
| 6,928,558 B1 | 8/2005 | Allahwerdi et al. |
| 6,965,872 B1 | 11/2005 | Grdina |
| 6,996,409 B2 | 2/2006 | Gopinath et al. |
| 7,013,125 B2 | 3/2006 | Henrikson |
| 7,080,049 B2 | 7/2006 | Truitt et al. |
| 7,089,208 B1 | 8/2006 | Levchin et al. |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,386,477 B2 | 6/2008 | Fano |
| 7,413,119 B2 | 8/2008 | Kubo et al. |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,527,192 B1 | 5/2009 | Chaskin et al. |
| 7,546,266 B2 | 6/2009 | Beirne et al. |
| 7,558,777 B1 | 7/2009 | Santos |
| 7,660,772 B2 | 2/2010 | Verkama |
| 7,748,614 B2 | 7/2010 | Brown |
| 7,752,135 B2 | 7/2010 | Brown et al. |
| 7,792,518 B2 | 9/2010 | Trioano et al. |
| 7,848,500 B2 | 12/2010 | Lynam et al. |
| 7,848,980 B2 | 12/2010 | Carlson |
| 7,870,044 B2 | 1/2011 | Robertson |
| 7,870,077 B2 | 1/2011 | Woo et al. |
| 7,890,433 B2 | 2/2011 | Singhal |
| 8,024,781 B2 | 9/2011 | Saunders et al. |
| 8,073,774 B2 | 12/2011 | Pousti |
| 8,116,730 B2 | 2/2012 | Smith |
| 8,245,044 B2 | 8/2012 | Kang |
| 8,280,906 B1 | 10/2012 | Lillibridge et al. |
| 2001/0003093 A1 | 6/2001 | Lundin |
| 2001/0037264 A1* | 11/2001 | Husemann et al. ............ 705/26 |
| 2001/0051920 A1 | 12/2001 | Joao et al. |
| 2002/0004751 A1 | 1/2002 | Seki et al. |
| 2002/0013727 A1 | 1/2002 | Lee |
| 2002/0016769 A1 | 2/2002 | Barbara et al. |
| 2002/0017561 A1 | 2/2002 | Tomoike |
| 2002/0025797 A1 | 2/2002 | Joao et al. |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0111908 A1 | 8/2002 | Milberger et al. |
| 2002/0120582 A1 | 8/2002 | Elston et al. |
| 2002/0193094 A1 | 12/2002 | Lawless et al. |
| 2003/0023505 A1 | 1/2003 | Eglen et al. |
| 2003/0065525 A1 | 4/2003 | Giachhetti et al. |
| 2003/0119478 A1 | 6/2003 | Nagy et al. |
| 2003/0125969 A1 | 7/2003 | Kizer et al. |
| 2003/0126076 A1 | 7/2003 | Kwok |
| 2003/0191711 A1 | 10/2003 | Jamison et al. |
| 2003/0212601 A1 | 11/2003 | Silva et al. |
| 2004/0019564 A1 | 1/2004 | Goldhwaite et al. |
| 2004/0044582 A1 | 3/2004 | Chowdhary |
| 2004/0122685 A1 | 6/2004 | Bunce |
| 2004/0185827 A1 | 9/2004 | Parks |
| 2004/0230527 A1 | 11/2004 | Hansen et al. |
| 2004/0248596 A1* | 12/2004 | Panchal ................ 455/466 |
| 2004/0252814 A1 | 12/2004 | Eakin |
| 2004/0254868 A1 | 12/2004 | Kirkland et al. |
| 2005/0055296 A1 | 3/2005 | Hattersley et al. |
| 2005/0055309 A1 | 3/2005 | Williams et al. |
| 2005/0086164 A1 | 4/2005 | Kim et al. |
| 2005/0144020 A1* | 6/2005 | Muzaffar et al. ............ 705/1 |
| 2005/0177442 A1 | 8/2005 | Sullivan et al. |
| 2005/0177517 A1 | 8/2005 | Leung et al. |
| 2005/0197892 A1 | 9/2005 | Bilibin et al. |
| 2005/0199709 A1 | 9/2005 | Linlor |
| 2005/0245257 A1 | 11/2005 | Woodhill |
| 2006/0018450 A1 | 1/2006 | Sandberg-Diment |
| 2006/0121880 A1 | 6/2006 | Cowsar et al. |
| 2006/0131390 A1 | 6/2006 | Kim |
| 2006/0206709 A1 | 9/2006 | Labrou et al. |
| 2006/0224470 A1 | 10/2006 | Garcia Ruano et al. |
| 2006/0248011 A1 | 11/2006 | Hecht-Nielsen |
| 2006/0253335 A1 | 11/2006 | Keena et al. |
| 2006/0258331 A1 | 11/2006 | Syrett et al. |
| 2006/0259438 A1 | 11/2006 | Randle et al. |
| 2006/0276171 A1 | 12/2006 | Pousti |
| 2006/0294025 A1 | 12/2006 | Mengerink |
| 2007/0005467 A1 | 1/2007 | Haigh et al. |
| 2007/0011104 A1 | 1/2007 | Leger et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0063017 A1 | 3/2007 | Chen et al. |
| 2007/0094080 A1 | 4/2007 | Wilken |
| 2007/0100651 A1 | 5/2007 | Ramer et al. |
| 2007/0118477 A1 | 5/2007 | Graves et al. |
| 2007/0123219 A1 | 5/2007 | Lovell, Jr. |
| 2007/0123229 A1 | 5/2007 | Pousti |
| 2007/0124490 A1 | 5/2007 | Kalavade et al. |
| 2007/0130025 A1 | 6/2007 | Nakajima |
| 2007/0130044 A1 | 6/2007 | Rowan |
| 2007/0133768 A1 | 6/2007 | Singh |
| 2007/0156517 A1 | 7/2007 | Kaplan et al. |
| 2007/0168462 A1 | 7/2007 | Grossberg |
| 2007/0175978 A1 | 8/2007 | Stambaugh |
| 2007/0198510 A1 | 8/2007 | Ebanks |
| 2007/0203792 A1 | 8/2007 | Rao |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tumminaro et al. |
| 2007/0250711 A1 | 10/2007 | Storey |
| 2007/0255653 A1 | 11/2007 | Tumminaro et al. |
| 2007/0255662 A1 | 11/2007 | Tumminaro et al. |
| 2007/0260556 A1* | 11/2007 | Pousti ............................ 705/75 |
| 2007/0265921 A1 | 11/2007 | Rempe |
| 2007/0266034 A1 | 11/2007 | Pousti |
| 2007/0266130 A1 | 11/2007 | Mazur et al. |
| 2007/0270125 A1 | 11/2007 | Pousti |
| 2008/0000923 A1 | 1/2008 | Berge |
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0082509 A1 | 4/2008 | Bessieres et al. |
| 2008/0091614 A1 | 4/2008 | Bas Bayod et al. |
| 2008/0097851 A1 | 4/2008 | Bemmel et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120190 A1 | 5/2008 | Joao et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1 | 6/2008 | Carlson |
| 2008/0160970 A1 | 7/2008 | Srinivas Reddy et al. |
| 2008/0167017 A1 | 7/2008 | Wentker et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |

(56) References Cited

U.S. PATENT DOCUMENTS

| | | |
|---|---|---|
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0262929 A1 | 10/2008 | Behr |
| 2008/0275779 A1 | 11/2008 | Lakshminarayanan |
| 2008/0279360 A1 | 11/2008 | Veenstra et al. |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2008/0307317 A1 | 12/2008 | Yohai-Giochais |
| 2009/0006184 A1 | 1/2009 | Leach et al. |
| 2009/0006276 A1 | 1/2009 | Woolston |
| 2009/0024614 A1 | 1/2009 | Pousti |
| 2009/0029687 A1 | 1/2009 | Ramer et al. |
| 2009/0030838 A1 | 1/2009 | Jacob et al. |
| 2009/0044216 A1 | 2/2009 | McNicoll |
| 2009/0055292 A1 | 2/2009 | Chong et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0077640 A1 | 3/2009 | Wang |
| 2009/0081989 A1 | 3/2009 | Wuhrer |
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0248533 A1 | 10/2009 | Colemen et al. |
| 2009/0265273 A1 | 10/2009 | Guntupali et al. |
| 2009/0276730 A1 | 11/2009 | Aybes et al. |
| 2009/0281904 A1 | 11/2009 | Pharris |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057623 A1 | 3/2010 | Kapur et al. |
| 2010/0070757 A1 | 3/2010 | Martinez |
| 2010/0094732 A1 | 4/2010 | Smith |
| 2010/0106620 A1 | 4/2010 | Marcus |
| 2010/0114775 A1 | 5/2010 | Griffin |
| 2010/0125514 A1 | 5/2010 | Blackhurst et al. |
| 2010/0125737 A1 | 5/2010 | Kang |
| 2010/0130165 A1 | 5/2010 | Snyder et al. |
| 2010/0145802 A1 | 6/2010 | Nowacek et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1* | 8/2010 | Schuba et al. .................. 705/34 |
| 2010/0223110 A1 | 9/2010 | Slavin et al. |
| 2010/0223183 A1 | 9/2010 | Smith |
| 2010/0228580 A1 | 9/2010 | Zoldi et al. |
| 2010/0235276 A1 | 9/2010 | Smith |
| 2010/0250359 A1 | 9/2010 | Gillenson et al. |
| 2010/0250687 A1 | 9/2010 | Smith |
| 2010/0267362 A1 | 10/2010 | Smith et al. |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0306832 A1 | 12/2010 | Mu et al. |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035240 A1 | 2/2011 | Joao et al. |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0125610 A1 | 5/2011 | Goodsall et al. |
| 2011/0143710 A1 | 6/2011 | Hirson |
| 2011/0143711 A1 | 6/2011 | Hirson |
| 2011/0287748 A1 | 11/2011 | Angel et al. |
| 2011/0295750 A1 | 12/2011 | Rammal |
| 2011/0320291 A1 | 12/2011 | Coon et al. |
| 2012/0171990 A1 | 7/2012 | Williams et al. |

FOREIGN PATENT DOCUMENTS

| | | |
|---|---|---|
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2006/092726 A2 | 9/2006 |
| WO | 2007004792 | 1/2007 |
| WO | 2007084593 | 7/2007 |
| WO | 2007102648 | 9/2007 |
| WO | WO 2007102648 | 9/2007 |
| WO | 2007127521 | 11/2007 |
| WO | WO-2009/036511 | 3/2009 |
| WO | 2009044396 | 4/2009 |
| WO | 2009142833 | 11/2009 |

OTHER PUBLICATIONS

Aradiom Inc., "The Real Solution—Aradiom SolidPass", located at http://www.aradiom.com/SolidPass/2fa-OTP-security-token.htm, available at least by Apr. 24, 2009.

Chua, Lye Heng, "How Customers Applied Java CAPS?" Sun Microsystems, Inc. presentation, Nov. 6, 2007.

International Application No. PCT/US10/24525, International Search Report and Written Opinion, May 17, 2010.

International Application No. PCT/US10/24535, International Search Report and Written Opinion, May 25, 2010.

International Application No. PCT/US10/30338, International Search Report & Written Opinion, Jun. 3, 2010.

International Application No. PCT/US2009/033823, International Search Report and Written Opinion, Sep. 24, 2009.

International Application No. PCT/US2009/039723, International Search Report and Written Opinion, Oct. 30, 2009.

Mobilians Co. Ltd., company website located at http://www.mobilians.co.kr/english/, available at least by Janaury 12, 2009.

PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.

PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.

Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.

(56) References Cited

OTHER PUBLICATIONS

Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawsky J, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.
Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.
International Application No. PCT/US2010/021054, International Search Report and Written Opinion, Jul. 29, 2010.
International Application No. PCT/US2010/032668, International Search Report and Written Opinion, Jul. 1, 2010.
International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
Arrington, Michael, "Mobile Paymetns Getting Traction on Social Networks but Fees are SkyHigh," Tech Crunch, located at http://techcrunch.com/2009/01/13/mobile-payments-getting-traction-on-social-networks-but-fees-are-sky-high/, Jan. 13, 2009.
Brooks, Rod, "MobillCash: Worlds First in Mobile Payments," YouTube online video located at http://www.youtube.com/watch?v=j6Xv35qSmbg, Oct. 12, 2007.
Bruene, Jim, "PayPal Launches on Facebook: Who Wants to be the First Bank?" located at http://www.netbanker.com/2007/06/paypal_launches_on_facebook_who_wants_to_be_the_first_bank_on_facebook.html, Jun. 22, 2007.
Chen, Will, "Gift Shop Credits Have Arrived," The Facebook Blog, located at http://blog.facebook.com/blog.php?post=36577782130, Oct. 31, 2008.
Federal Trade Commission, "Children's Online Privacy Protection Act (COPPA)," 15 U.S.C. §§ 6501-6506, Oct. 21, 1998.
International Application No. PCT/US2010/020189, International Search Report and Written Opinion, Dec. 10, 2010.
International Application No. PCT/US2010/057472, International Search Report and Written Opinion, Jan. 18, 2011.
International Application No. PCT/US2010/059295, International Search Report and Written Opinion, Feb. 1, 2011.
International Application No. PCT/US2010/059466, International Search Report and Written Opinion, Feb. 1, 2011.
International Application No. PCT/US2011/022419, International Search Report and Written Opinion, Mar. 29, 2011.
International Application No. PCT/US2011/022426, International Search Report and Written Opinion, Mar. 28, 2011.
International Application No. PCT/US2011/026301, International Search Report and Written Opinion, Apr. 28, 2011.
Lee, Jessica, "Payment Industry Perspectives: Q&A with Zong CEO David Marcus," located at http://www.insidefacebook.com/2009/05/19/payment-industry-persectives-qa-with-zong-ceo-david-marcus/, May 19, 2009.
Nicole, Kristen, "Pay Me Lets You Send and Receive Money Though Facebook," located at http://mashable.com/2007/06/17/pay-me-facebook-app, Jun. 17, 2007.
Onebip S.r.l. "OneBip—How to Pay Online with Your Mobile Phone," YouTube online video located at http://www.youtube.com/watch?v=RiEsMcc0tJY, May 23, 2007.
Zong, Inc., "Zong Mobile Payment Demo on a Facebook App," YouTube online video located at http://www.youtube.com/watch?v=aLjRcAFrGil, Jan. 5, 2009.
Zong, Inc., "Zong Mobile Payments in Smallworlds," YouTube online video located at http://www.youtube.com/watch?v=Y6CEw3tSgBc, Feb. 10, 2009.
Zong, Inc., "Virtual Goods/Currency and Mobile Payments: The Business Model for Social Apps," The Zong Blog, located at http://blog.zong.com/2008/10/25/virtual-goods-currency-and-mobile-payments-the-business-model-for-social-apps/, Oct. 28, 2008.
Zong, Inc., "Zong—Mobile Payments for Your Web App," YouTube online video located at http://www.youtube.com/watch?v=O2C3SQraAvQ, Sep. 5, 2008.
European Patent Application No. 09711520.8, Extended Search Report mailed Apr. 27, 2011.
International Application No. PCT/US2010/050616, International Search Report and Written Opinion, Apr. 26, 2011.
International Application No. PCT/US2011/029760, International Search Report Written Opinion., Oct. 28, 2011.
International Application No. PCT/US2011/30039, International Search Report and Written Opinion, May 23, 2011.
International Application No. PCT/US2011/30038, International Search Report and Written Opinion, May 25, 2011.
OneBip S.R.L , "OneBip—to Pay Online with Your Mobile Phone", Youtube online video at http://www.youtube.com/watch?v=RiEsMcc0tJY, May 23, 2007.
Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/., Jan. 13, 2009.
Brooks, Rod , "MobilCash:Worlds First in Mobile Payments", YouTube online video located at http://youtube.com/watch?v=j6Xv35qSmbg., Oct. 12, 2007.
Bruene, Jim , "PayPal Launches on Facebook: Who Wants to be the First Bank?", located at http://www.netbanker.com/2007/06paypal_launches_on_facebook_who_wants_to_be_the_first_bank_on_facebook.html., Jun. 22, 2007.
Chen, Will "Gift Shop Credits Have Arrived", The Facebook Blog, located at gttp://blog.facebook.com/blog.php?post=36577782130, Oct. 31, 2008.
Federal Trade Commission, , "Children's Online Privacy Protection Act (COPPA)", 15 U.S.C. §§ 6501-6506, Oct. 21, 1998.
Ihlwan, Moon , "In Korea, Cell Phones Get a New Charge", http://businessweek.com/globalbiz/content/mar2006/gb20060301_260288.htm, Mar. 1, 2006.
Lee, Jessica , "Payment Industry Perspectives; Q&A with Zong CEO David Marcus", http://www.insidefacebook.com/2009/05/19payment-indusby-perspectives-qa-with-zong-ceo-david-marcus/, May 19, 2009.
Nicole, Kirsten , "Pay me Lets You Send and Receive Money Through Facebook", http://mashable.com/2007/06/17pay-me-facebook-app, Jun. 17, 2007.
Zong, Inc., , "Virtual Goods/Currency and Mobile Payments: The Business Model for Social Apps", The Zong Blog at http://blog-zong.com/2008/10/25/virtual-goods-currency-and-mobile-payments-the-business-model-for-social-apps/, Oct. 28, 2008.
Zong, Inc., , "Zong Mobile Payment Demo on a Facebook App", You Tube online video at http://www.youtube.com/watch?v=aLjRcAFrGil, Jan. 5, 2009.
Zong, Inc., , "Zong—Mobile Payments for Your Web App", You tube online video at http://www.youtube.com/watch?v=O2C3SQraAvQ, Sep. 5, 2008.

(56) References Cited

OTHER PUBLICATIONS

Zong, Inc., , "Zong Mobile Payments in Smallworlds", You Tube online video at http://www.youtube.com/watch?v=Y6CEw3tSgBc, Feb. 10, 2009.

"International Application No. PCT/US2011/051094", International Search Report and Written Opinion, Dec. 23, 2011.

International Application No. PCT/US12/25195, International Filing Date Feb. 15, 2012, International Search Report and Written Opinion, mailed on Apr. 26, 2012.

International Patent Application No. PCT/US11/51094 filed on Sep. 9, 2011, International Preliminary Report on Patentability mailed on Nov. 2, 2012.

International Preliminary Report on Patentability, International Application No. PCT/US12/25195, filed Feb. 15, 2012.

Ching, Andrew T. et al., "Payment card rewards programs and consumer payment choice", Journal of Banking & Finance, vol. 34, Issue 8, http://dx.doi.org/10.1016/j.jbankfin.2010.03.015. (http://www.sciencedirect.com/science/article/pii/S0378426610001196) , ISSN 0378-4266, Aug. 2010, pp. 1773-1787.

Garry, Michael , "Ending the paper chase", Progressive Grocer, May 1994.

National Consumers League, , "Mobile commerce: what's all the buzz?", http://www.nclnet.org/personal-finane/60-mobile-commerce/314-mobile-commerce-what . . . , Mar. 3, 2007.

Verizon, , "Ring Tones & Ringback Tones—Terms and Conditions", http://support.verizonwireless.com/terms/products/ringtones_ringbacktones.html, May 6, 2009.

\* cited by examiner

EFFECTING AN ELECTRONIC PAYMENT

TECHNICAL FIELD

The present invention relates to effecting an electronic payment from customers to vendors via an internet, wherein a vendor offers a product to potential customers over said internet and customers browse the Internet in order to make a purchase from the vendor.

BACKGROUND OF THE INVENTION

The offering of products for sale over the Internet has been known for a number of years. Many proposals have been made to effect secure electronic payment over the Internet and often this makes use of credit cards or debit cards.

However, problems may arise if purchases are relatively small, if the customer does not wish to make use of a credit/debit card or if a customer does not own a credit/debit card.

BRIEF SUMMARY OF THE INVENTION

According to an aspect of the present invention, there is provided a method of effecting an electronic payment from customers to vendors via an internet, wherein a vendor offers a product to potential customers over said internet, a customer browses the internet and said customer has a mobile cellular telephone configured to receive premium rate mobile terminating text messages, comprising the steps of: transmitting transaction details over transaction from said vendor to said browsing customer; transmitting order details on order from said browsing customer to said vendor that require a payment to be made by the customer; and transmitting a plurality of premium rate text messages to said telephone to effect said payment.

DESCRIPTION OF THE BEST MODE FOR CARRYING OUT THE INVENTION

FIG. 1

Figure 1:
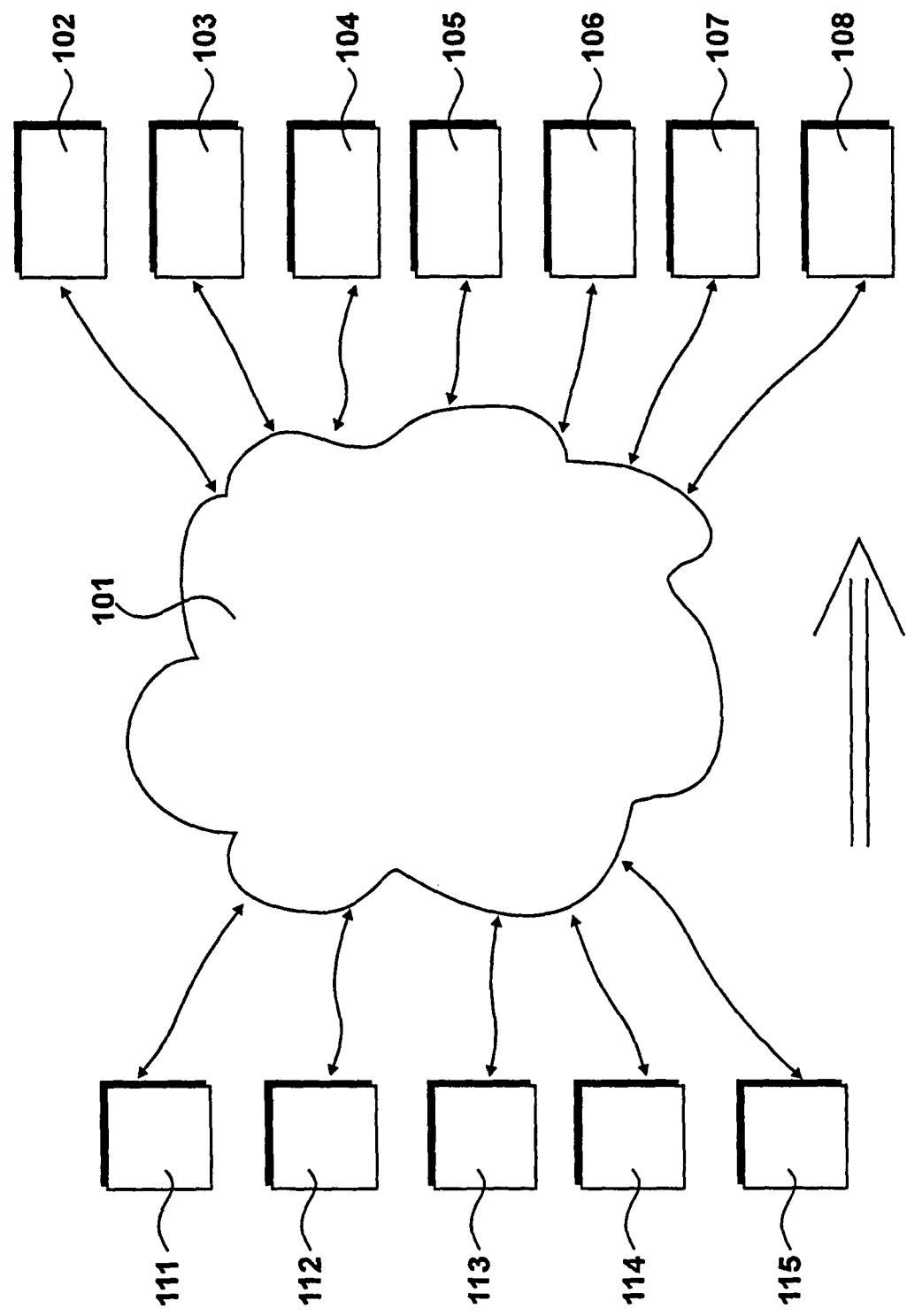
FIG. 1 shows an internet environment.

An internet environment is illustrated in FIG. 1 in which the Internet 101 allows customers 102 to 108 to obtain details of products from vendors 111 to 115 and to place orders with said vendors. As is well known, an example of a customer, such as customer 102 may make a request for a web page to be served, from, say, server 111. In response to receiving this web page, a customer may make a selection and then effect a purchase, such that it becomes necessary to effect an electronic payment from the customer to the vendor, usually via the Internet 101 itself.

FIG. 2

Figure 2:
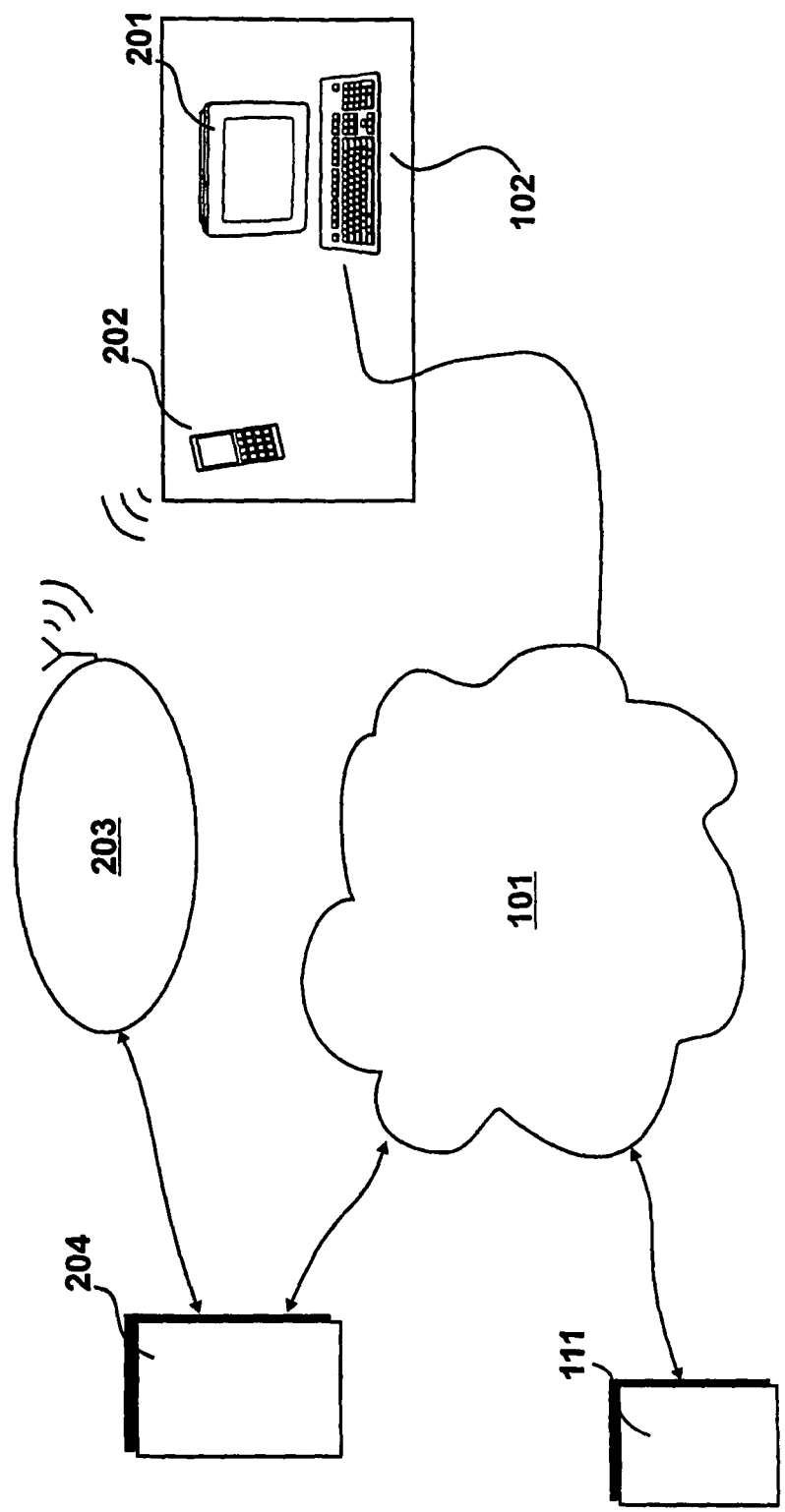
FIG. 2 shows an embodiment of the present invention in which a vendor communicates with a customer via the Internet.

An embodiment of the present invention is shown in FIG. 2 in which vendor 111 communicates with a customer 102 via the Internet 101. The vendor 111 has a web server configured to serve web pages to the browsing customers and to facilitate the electronic payment from customer 102.

Customer 102 has a browsing device 201, which may take the form of a desktop computer, a laptop computer or a mobile computer. In addition, the customer also has a mobile cellular telephone 202 configured to communicate with a mobile cellular telephone network 203. Mobile cellular telephone 202 is configured to receive premium rate mobile terminating text messages from the mobile cellular network 203. These premium rate text messages are primarily designed to provide enhanced services to the mobile cellular telephone 202, such as new ringtones, themes and wallpapers etc for which a payment is made. Thus, it is known for cellular telephones to receive premium rate terminating text messages, which would usually include a link to the service of interest (data to be provided by wireless application protocol (WAP) service for example) and for a charge to be made to the mobile user's account when such a message is transmitted. Thus, by requesting a message of this type a user may receive an additional charge on their mobile telephone account of say $2 (two dollars), representing the charge for a particular ringtone for example.

In accordance with a preferred embodiment, transaction details of a transaction between a vendor 111 and a browsing customer 102 (via browser 201) are transmitted from the vendor 111 to the browser 201. In response to receiving details of the transaction, order details are transmitted from the browsing customer to the vendor, thereby initiating a process by which a payment is required to be made. In order to achieve this, the vendor initiates a process in which a plurality of premium rate text messages are transmitted to mobile telephone 202 thereby effecting the payment.

In a preferred embodiment, such a process is achieved by the provision of a purchase server 204 which receives instructions to pay from many product servers, such as product server 111 and this use commands to one of many selected mobile cellular telephone networks, such as cellular telephone network 203. In this way, under the control of the purchase server 204, the cellular mobile telephone network 203 transmits a plurality of premium rate text messages to the telephone 202 in order to effect the payment.

In the embodiment shown in FIG. 2, a user 102 is provided with a mobile cellular telephone 202 and a separate browsing platform 201. However, in an alternative embodiment, browsing platform 201 could be incorporated within a mobile cellular telephone 202, such as on platforms usually referred to as "smart phones".

FIG. 3

Figure 3:
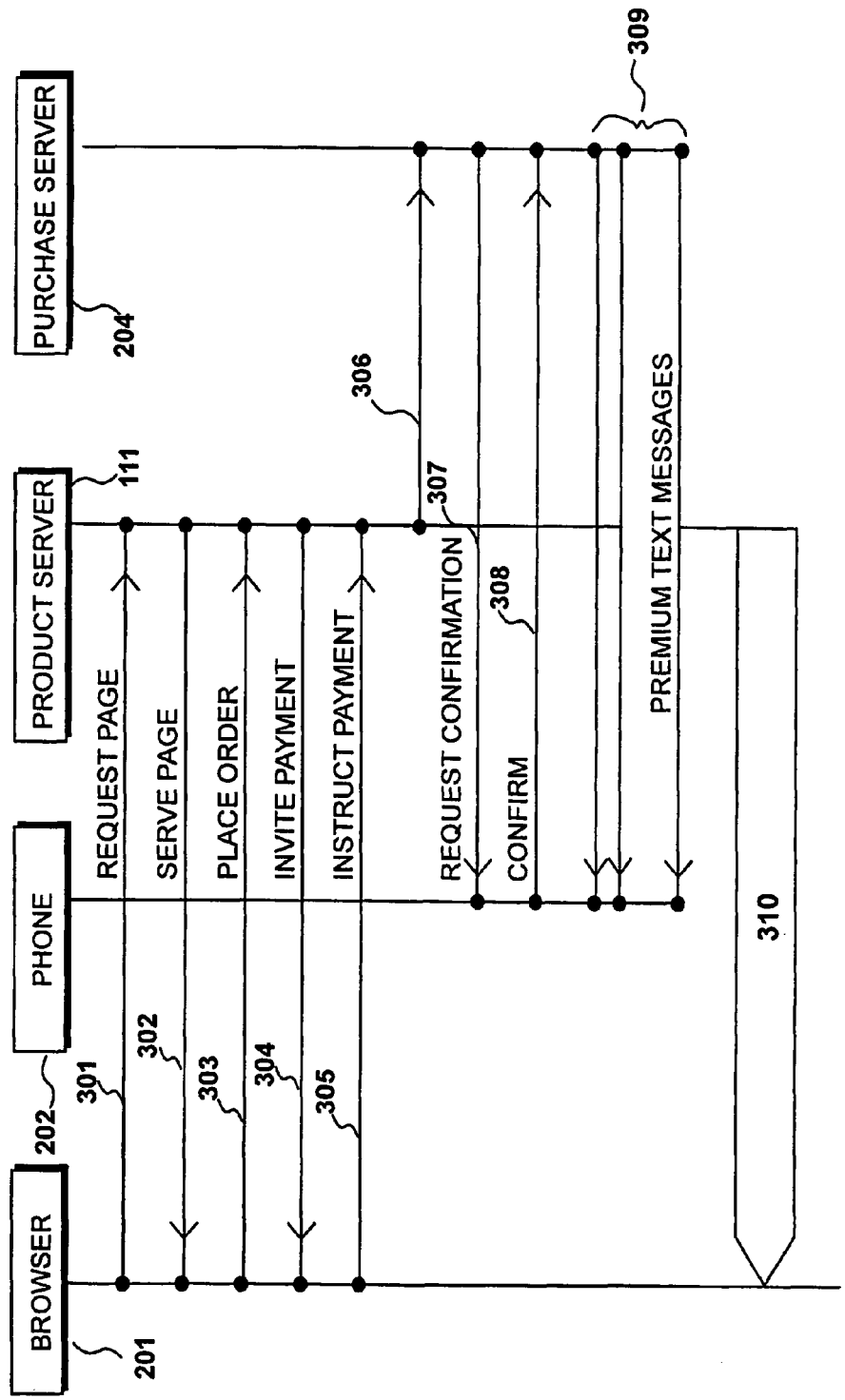
FIG. 3 illustrates procedures conducted within the environment of FIG. 2.

Procedures conducted within the environment of FIG. 2 are detailed in FIG. 3 in the form of a telecommunications diagram. The diagram of FIG. 3 includes the browser 201, the cellular telephone 202, the product server 111 and the purchase server 204.

Initially, the browser 201 makes a request 301 for a page to be supplied from the product server 111.

In response to receiving this request, a page service 302 is made such that the browser receives data resulting in a page being displayed at the browser.

In response to viewing the served page, a request 303 for an order is placed to the product server 111. In response to receiving this order, the product server 111 makes an invitation 304 for payment to be made.

In response to receiving an invitation for a payment to be made, the browser makes an instruction 305 in order to effect the payment.

In a preferred embodiment, payment is made by issuing premium rate text messages to mobile phone 202.

Thus, in the embodiment, the product server 111 issues an instruction 306 to the purchase server 204.

The purchase server 204 issues a request 307 to the mobile cellular telephone 202 for a confirmation to the effect that the payment is to be made.

Following this example of the preferred embodiment, the user of the mobile telephone 202 issues a confirmation 308 back to the purchase server (via cellular telephone network 203) to the effect that the purchase has been confirmed.

At this point is should be noted that most networks will not issue a charge for mobile terminating request confirmation 307. However, it is likely that a modest charge will be made for mobile originating confirmation 308.

Upon receiving the request confirmation 308 the purchase server schedules and issues a plurality of premium text messages 309.

Thereafter, following completion of the issuing of the premium text messages or after a certain number of text messages have been transmitted, the product, virtual product or service is transmitted from the product server 111 to the browser 202 as illustrated by arrow 310.

Thus, the actual nature of the transaction may involve real physical goods, although it is envisaged for most physical goods payment by credit or debit card would be preferred. Firstly, for such goods, it is possible that the total payment will be relatively large. Secondly, it is also envisaged that the present preferred embodiment will introduce substantial delay between the transaction being effected and payment being finally received by the vendor.

Similarly, it is possible for services to be paid for in this way but most services for which the services considered most appropriate will involve further uses of internet interaction. Thus, many of the services may include subscriptions to particular groups within an internet environment which will then facilitate enhanced use of a particular service. Thus, in this way, it is possible to subscribe to internet services without making reference to a credit card or similar financial instrument. Many of these payments are relatively modest and it is anticipated that the majority of users would have easy access to a mobile cellular telephone.

Another preferred use for this application involves the provision of virtual goods. Virtual goods may be considered as items that do not have a physical existence but have a virtual presence within appropriate virtual environments. Thus, an example of a virtual good would be that of an item for use within an internet game. Thus, within modelling games for example it is possible to buy property within the game or other equipment that may be used within the game.

FIG. 4

Figure 4:
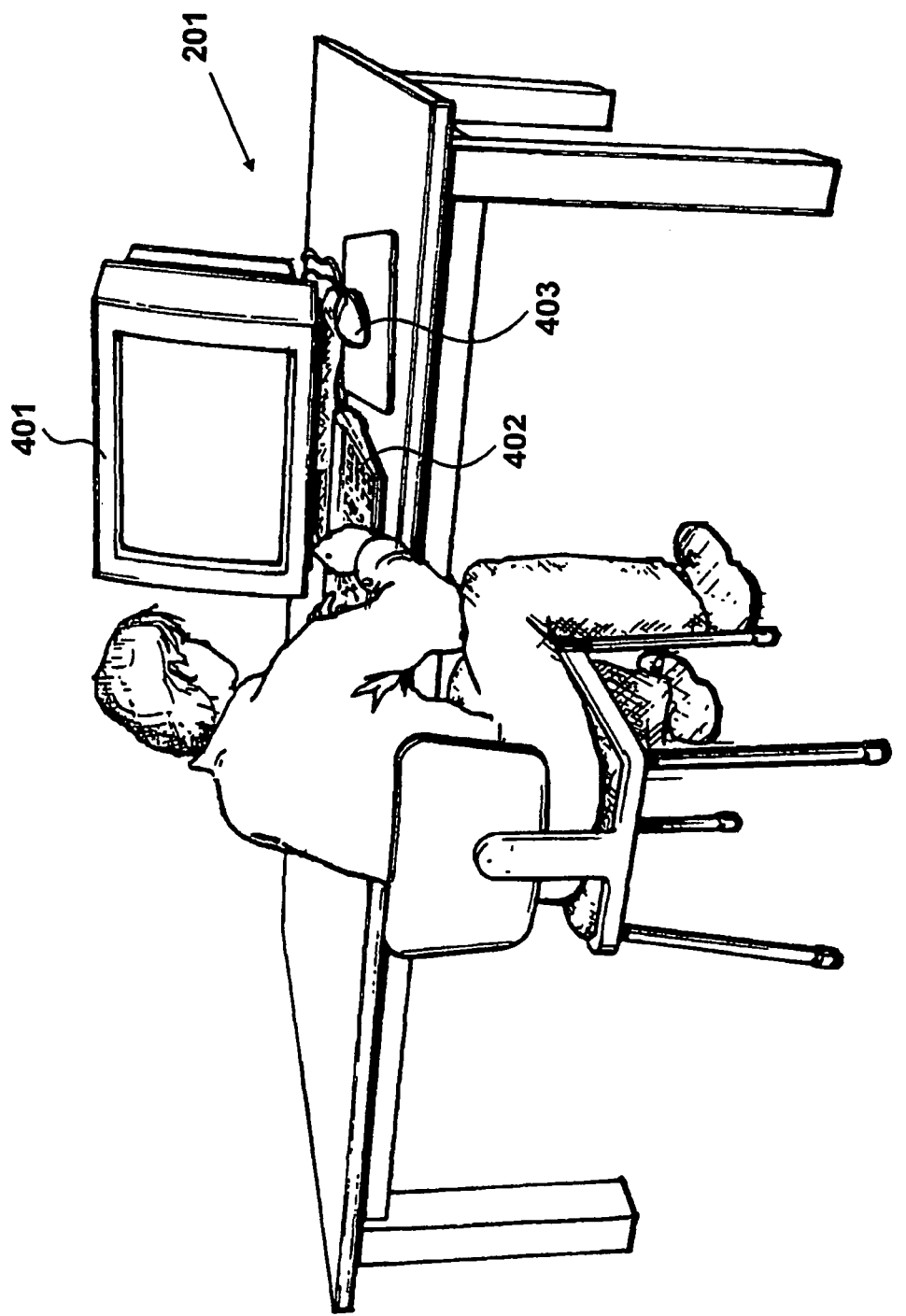
FIG. 4 shows an example of a browser.

An example of a browser 201 is illustrated in FIG. 4. A visual display unit 401 is provided to allow web pages to be displayed. Furthermore, a user provides input via a keyboard 402 and a mouse 403. In this way, it is possible for payment to be made for goods, virtual goods or services, that may be collectively referred to as a product. These are ordered via the browser 201 communicating with a server, such as server 111. The browser would place an order for the product over the Internet 101 and would then be required to effect payment for the product. In accordance with a preferred aspect of the present embodiment, the user at the browser identifies details of a mobile cellular telephone. Thereafter, the mobile cellular telephone receives a plurality of premium rate mobile terminating text messages in order to effect the payment.

As shown in FIG. 4, the browser takes the form of a desktop computer but in an alternative embodiment the browser could be executed on a laptop computer or a mobile computer.

FIG. 5

Figure 5:
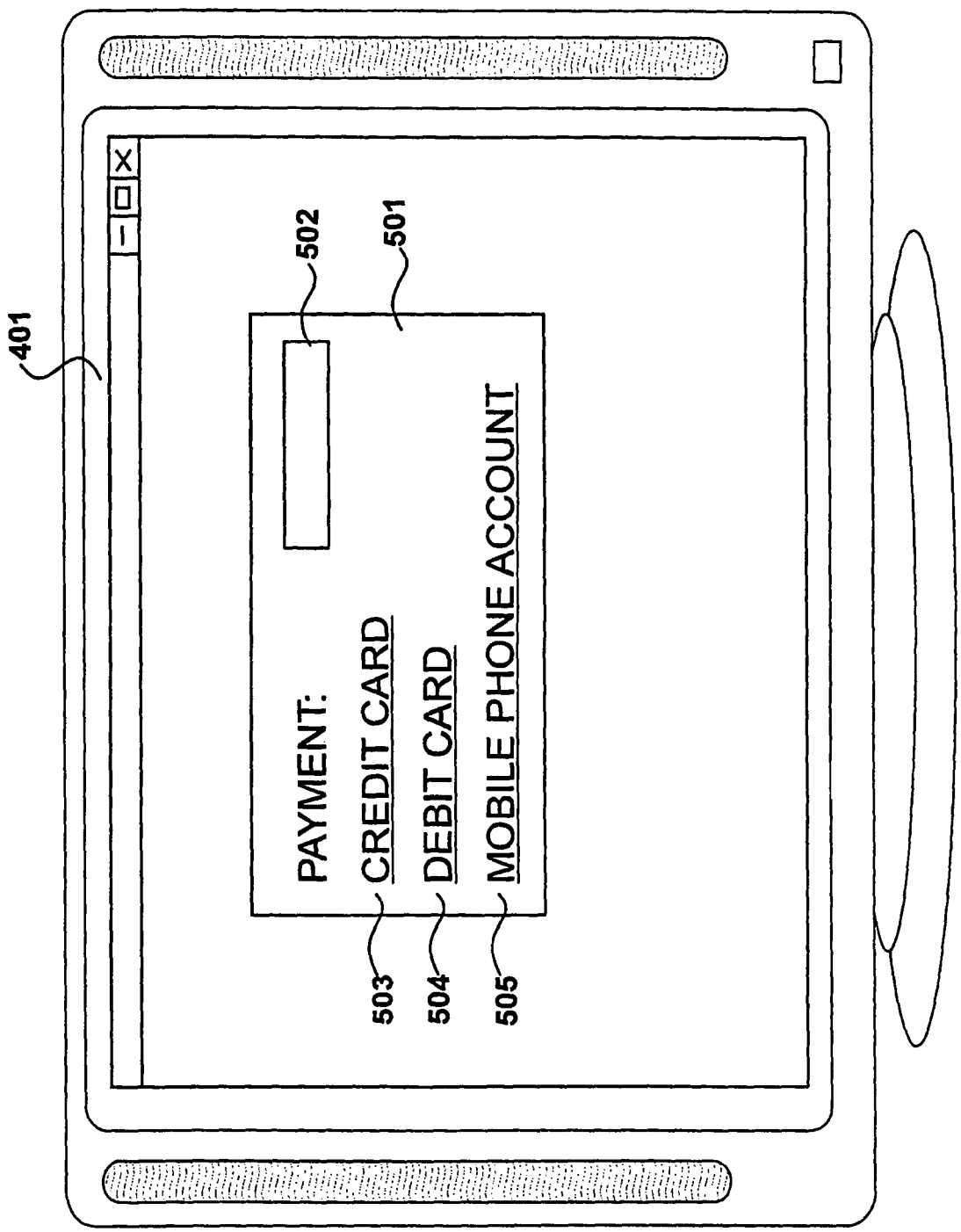
FIG. 5 illustrates a screen displayed initiating the process for a payment to be made.
Figure 6:
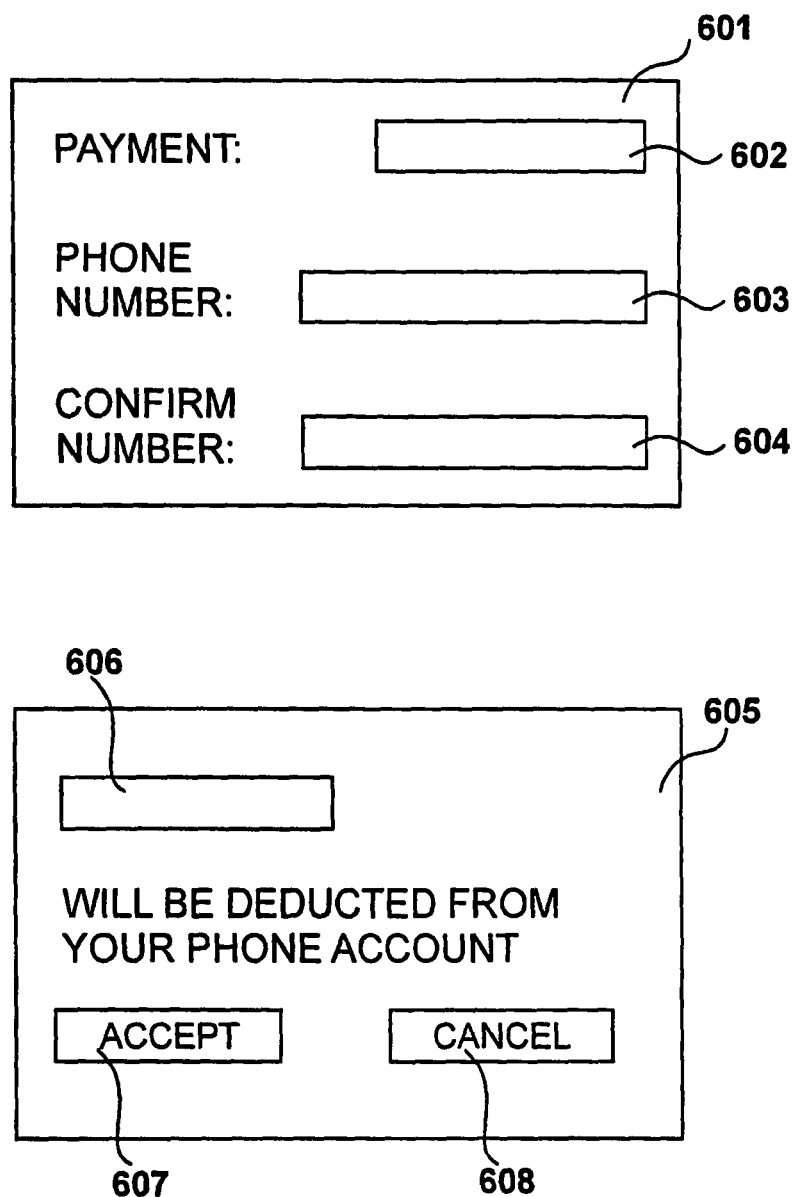
FIG. 6 shows screens displayed during payment procedures.

A screen shown on monitor 401 is shown in FIG. 5, initiating the process for a payment to be made.

Having placed an order for a product, a display 501 is shown that includes a field 502 in which the current price is displayed. Thereafter, it is possible for the user to select payment via a credit card, via link 503, via a debit card via link 504 or via mobile phone account, via link 505. In a preferred embodiment, each of these links may be duplicated and would often be associated with appropriate logo.

FIG. 6

In the preferred embodiment, payment is effected via the mobile phone account. Thus, as a result of clicking link 505 in FIG. 5, screen 601 is displayed. Screen 601 also includes a field 602 identifying the required payment. In the preferred embodiment, the total payment figure will have been increased so as to include an additional price for effecting payment via the mobile cellular telephone network. Assuming a user wishes to continue, the user is invited to enter a cellular telephone number in a field 603 and the user may be asked to confirm this number in a further field 604. After confirming the payment, a further screen 605 may be displayed, subject to the particular implementation of the application.

Screen 605 includes a field 606 again identifying the total payment. The screen then continues to say that this amount will be deducted from the telephone account and a user is invited to accept the transaction by operating button 607 or to decline the transaction by operating a cancel button 608.

Figure 7:
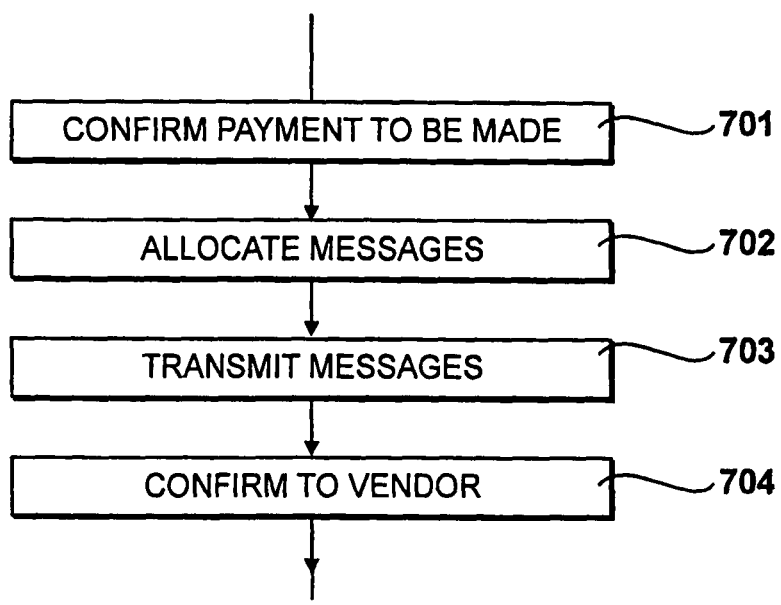
FIG. 7 shows procedures performed by the purchase server.

Procedures implemented by purchase server 204 are identified in FIG. 7. The purchase server provides for the operating of a payment via the Internet in which details are received of a transaction from a product server 111 identifying a price to be paid by a customer. Details of the customer's mobile telephone are received at the purchase server 111 and thereafter a plurality of premium rate text messages are transmitted to the telephone to effect the payment.

The pressing of accept button 607 may be considered as the completion of an instruct payment request 305, whereafter the instruction is transmitted from the product server 111 to the purchase server 204.

FIG. 7

Procedures performed by the purchase server 204 are identified in FIG. 7. In response to receiving instructions 306, the purchase server 204 seeks confirmation from the mobile telephone at step 701 to the effect that the payment is to be made.

Figure 9:
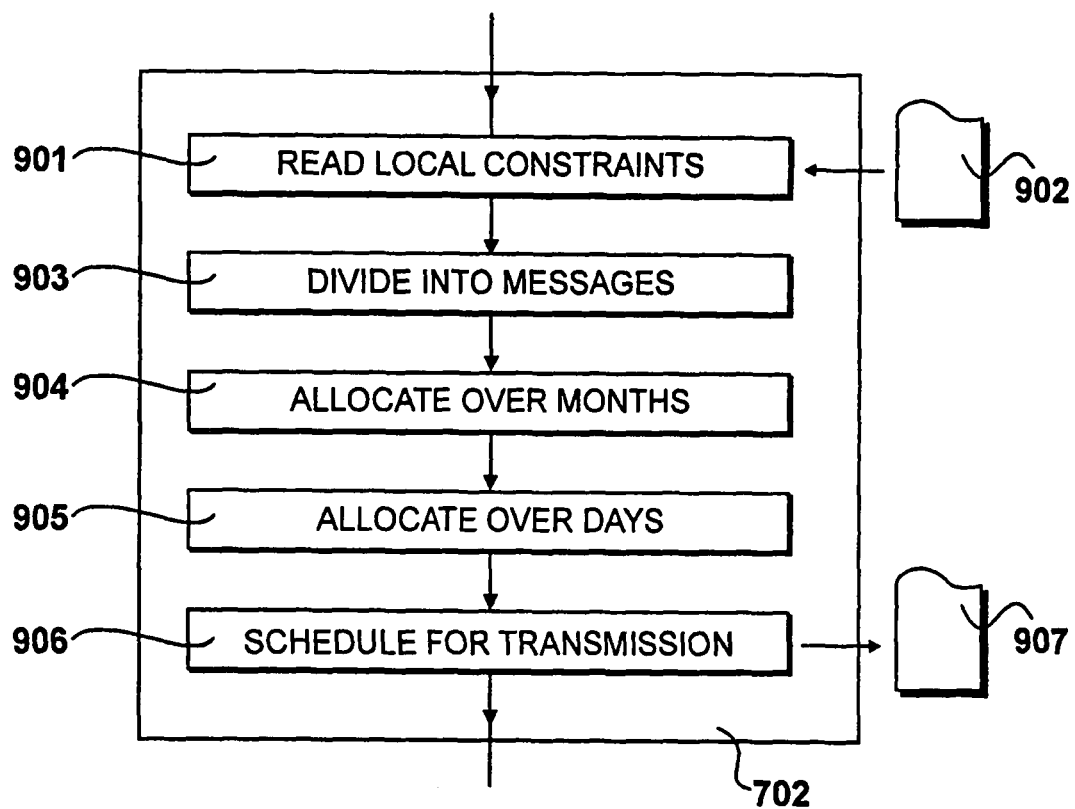
FIG. 9 illustrates the procedure for the allocation of messages.
Figure 10:
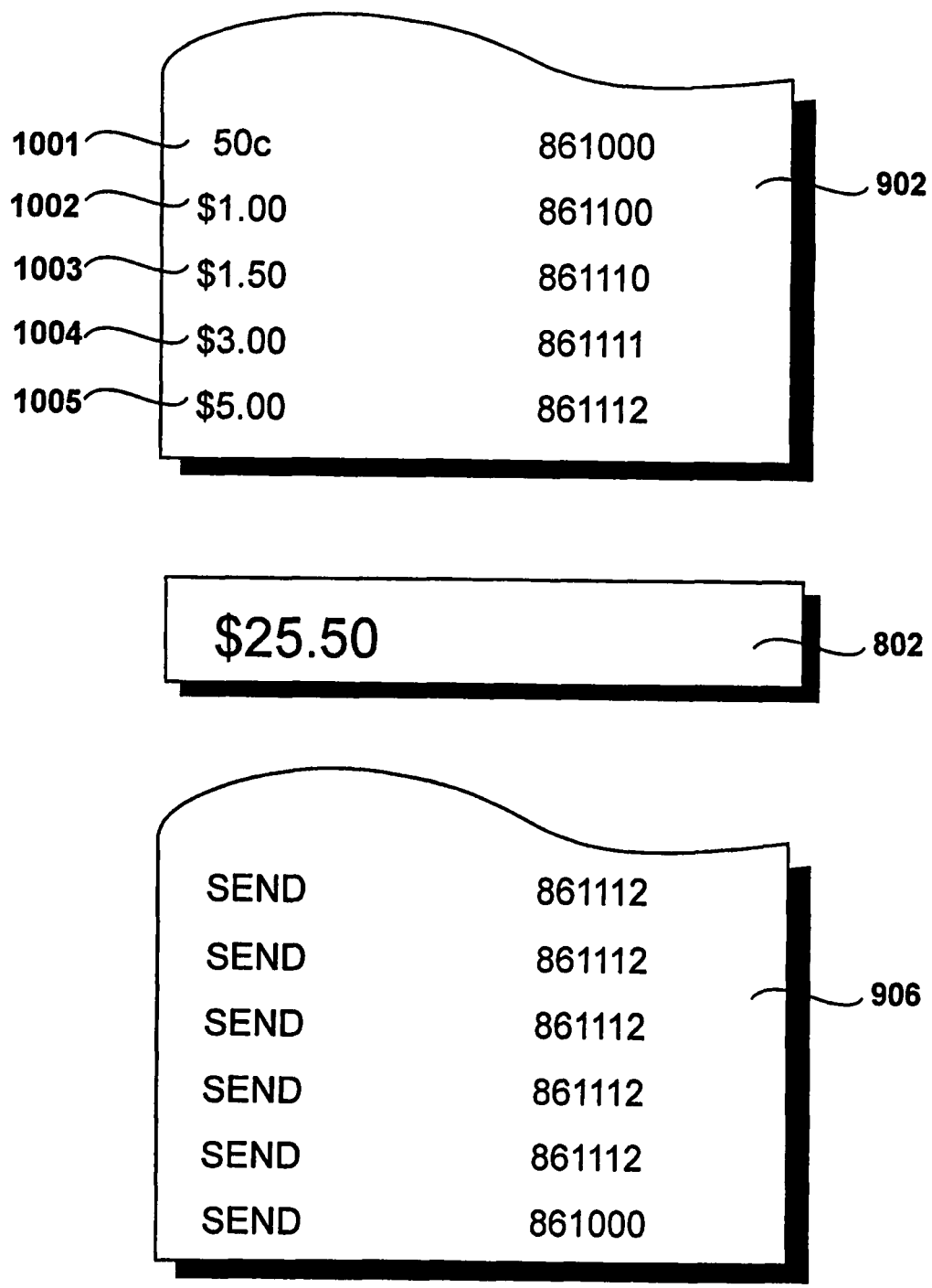
FIG. 10 shows an example of a constraints file.

Upon receiving confirmation 308, messages are allocated at step 702, as referenced with respect to FIGS. 9 and 10.

At step 703 the premium rate messages are transmitted and at step 704 confirmation is provided to the vendor to the effect that payment has been made.

FIG. 8

Figure 8:
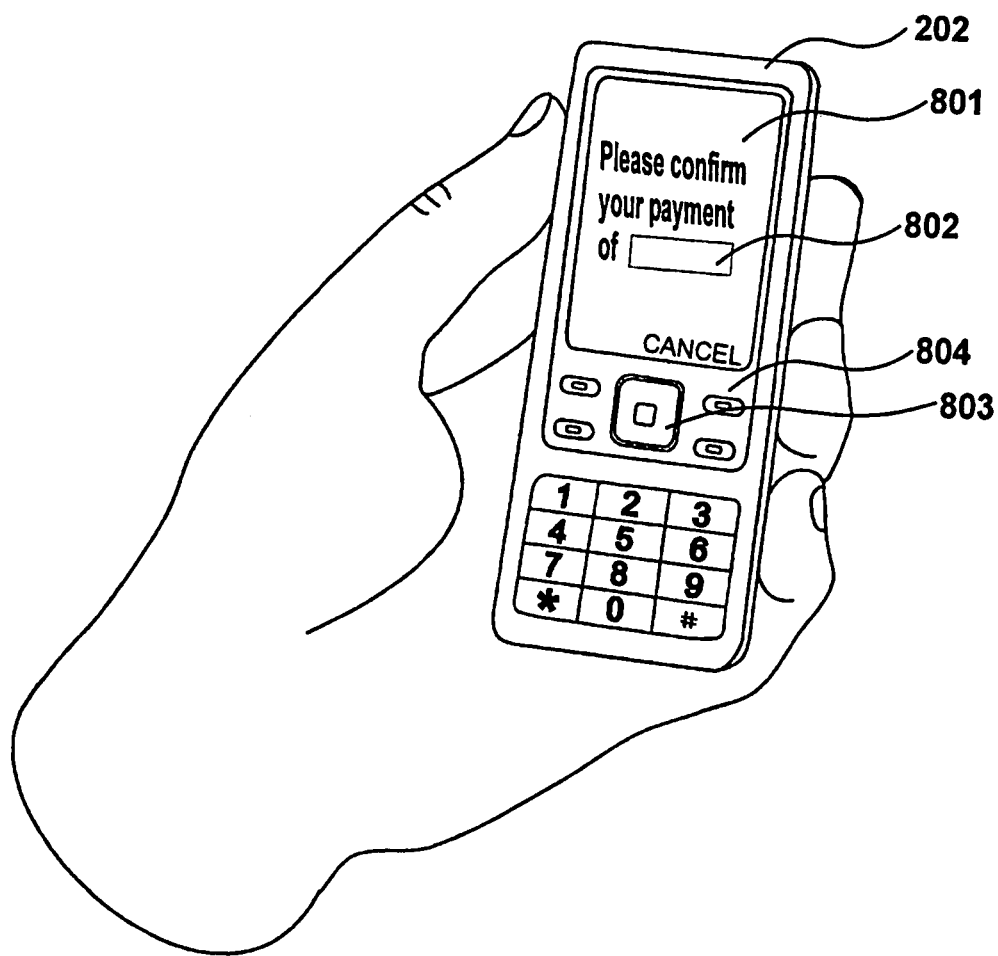
FIG. 8 illustrates the results of the procedure for confirming payment.

The result of procedure 701 for confirming the payment is illustrated in FIG. 8. As shown in FIG. 8, mobile phone 202 receives a message displayed on a mobile phone display 801. As shown, the message states "please confirm your payment of" and the amount is displayed in a field of the display 802. In this example, it is possible to confirm the payment by operating the central navigation button 803 or alternatively the transaction may be cancelled by the operation of a cancel button 804. As previously stated, confirmation creates a mobile originating message accepting the charge that may incur a modest charge for transmission through the network. In this example, a dedicated mobile telephone is shown. However, it should also be appreciated that the mobile telephone designation also includes other devices with mobile telephony functionality.

FIG. 9

Procedure 702 for the allocation of messages is illustrated in FIG. 9. At step 901 a file of data 902 is read that identifies appropriate local constraints for the transaction. Alternatively these details may be supplied from an appropriately configured database. The local constraints are relevant for the particular country in which the transaction is taking place, including appropriate currency for the transaction and other regulations relating to the use of premium rate messages. In particular, these constraints will identify the specific examples of premium rate messages that may be deployed, along with the level of payment that is associated with each of these messages. In addition, the constraints also specify maximum transaction values, usually restricting the total level of transactions that may occur during a day and often also identifying a maximum level of transactions that may take place over a month, given that many customers are billed on a monthly basis.

Thus, for example, an operator may specify that total transactions for a day must not exceed $30 (thirty dollars) and total transactions for the month must not exceed $200 (two hundred dollars). Typically, these constraints are applied across an operator's network and are not allocated on a customer-by-customer basis. At step 903 the total value of the transaction is divided into a plurality of messages such that, in combination, the value of the messages adds up to the total value of the transaction.

At step 904 an allocation is made over a number of months. If the total value of the transaction exceeds a monthly limit, it is necessary to spread the transmission of the messages over two or more months.

At step 905 an allocation is made over a number of days. Again, if either the total transaction or a monthly transaction exceeds the total transactions allowed for a particular day, the actual transmissions must take place over a number of days, with a plurality of messages being allocated for each individual day within the batch.

Under this scheme, it is possible that maximum transmissions could occur within, say, three days over a particular month. It is possible that the transactions could occur over more days, until the allocation for the month is reached. If the allocation for the month is reached, it is then necessary to continue making transmissions upon entering the next month.

At step 906 the transmissions are scheduled resulting in a generation of a transmission schedule 907.

FIG. 10

Referring to FIG. 10, an example of a constraints file 902 is illustrated. This defines a total transmission value for the day and a total transmission value for the month. In addition, it identifies valid premium rate message codes. Thus, in this example, at line 1001 a code 861000 effects a charge of 50 c (fifty cents) as shown at line 1002, a code of 861100 effects the charge of $1 (one dollar). Similarly, as illustrated at line 1003 a charge of $1.50 (one dollar, fifty) is effected as a result of transmitting code 861110. A code of 861111 results in a charge of $3.00 (three dollars) and, similarly, a $5.00 (five dollar) charge results from the transmission of code 861112.

An example of displayed field 802 is shown in FIG. 10 which, for the purposes of the illustration, indicates a charge of $25.50 (twenty-five dollars, fifty).

Having processed this figure following the procedures illustrated in FIG. 9, a schedule 906 is generated which may take the form of the example shown in FIG. 10. Thus, in order to create a charge of $25.50 (twenty-five dollars, fifty), premium message 861112 is sent five times, creating a charge of $25 (twenty-five dollars). This is then completed by sending code 861000, for a charge of 50 c (fifty cents), thereby giving a total charge of $25.50 (twenty-five dollars, fifty).

The invention claimed is:

1. A computer-implemented method, comprising:
    receiving, in a purchase server, a payment instruction from a web server of a vendor, wherein the web server offers a product to a customer via transmitting transaction details of a transaction to a web browser of the customer and receiving order details of an order from the web browser of the customer to initiate the payment instruction for a payment to be made by the customer to the vendor, wherein the order details include a payment amount and identify a mobile phone of the customer;
    communicating, by the purchase server via text message through a carrier server of a mobile phone of the customer at the phone number, to confirm the payment requested by the payment instruction;
    receiving, at the purchase server, a confirmation from the mobile phone of the customer in response to the communication;
    determining, by the purchase server, based on the payment amount requested by the payment instruction, a plurality of premium rate message codes corresponding to a plurality of premium text messages for transmission to a recipient, wherein each respective premium rate message code of the plurality of premium rate message codes is predefined by the carrier server of the mobile phone to charge a predetermined amount, the premium rate message codes including at least first and second premium rate message codes each for different predetermined amount, wherein the payment amount is divided by the purchaser server such that, in combination, the predetermined amounts of at least the first and second premium rate message codes add up to the payment amount; and
    transmitting, from the purchase server through the carrier server of the mobile phone, the plurality of premium text messages to the mobile phone of the customer at the mobile phone number in response to the confirmation from the mobile phone, wherein the customer is to be charged on an account of the mobile phone held by the carrier server according to the predetermined amounts, including the first and second different amounts matching respectively the first and the second of the premium rate message codes, of the plurality of premium rate message codes of the plurality of premium text messages for a total of the payment amount.

2. A method according to claim 1, further comprising:
    determining by the purchase server, a schedule for transmission, wherein the transmission of the plurality of premium text messages to the mobile phone of the customer is according to the schedule over the period of time.

3. A method according to claim 2,
    wherein said transaction details also identifies an additional price for effecting payment via mobile telephone.

4. A method according to claim 1,
wherein said transaction details identify a payment currency.

5. A method according to claim 1, wherein the communicating with the mobile phone of the customer to confirm the payment comprises:
transmitting a confirmation text message through the carrier server to the mobile telephone after the order has been placed in the web server of the vendor; and
receiving a confirmation through the carrier server from the customer before the plurality of premium rate messages are transmitted.

6. A method according to claim 5,
wherein said confirmation from the customer is made via a mobile originating text message.

7. A method according to claim 1,
wherein the premium messages are transmitted according to a schedule that is based at least in part on time constraints that only allow up to a maximum sum value of predetermined amounts of premium messages within a predetermined time frame.

8. A method according to claim 1,
wherein a fee, in addition to a price charged by the vendor for the product, for completing the transaction via the mobile phone of the customer is identified to produce the payment amount.

9. A method according to claim 8,
wherein the payment amount is divided into an appropriate number of premium rate messages based on network permitted messages.

10. A method according to claim 9,
wherein the schedule for the transmission of the plurality of premium rate messages is calculated based on maximum allowable transactions per unit of time.

11. A method according to claim 10,
wherein the maximum allowable transactions are daily maximum values.

12. A method according to claim 10,
wherein the maximum allowable transactions are monthly maximums.

13. A method according to claim 1,
wherein the plurality of premium rate messages are only transmitted after receiving a mobile originating message from the mobile phone of the customer agreeing to the payment.

14. A method according to claim 1,
wherein said browser is executed by a desktop computer, a laptop computer or a mobile computer separate from the mobile phone.

15. A method according to claim 1,
wherein said browser is included within said mobile phone.

16. A method according to claim 1,
wherein the schedule is determined based at least in part on the payment amount.

17. A method according to claim 1,
wherein the period of time is more than a day.

18. A method according to claim 17,
wherein the period of time is more than a month.

19. A system, comprising:
a first interface to a cellular telephone network;
a second interface to an internet; and
a purchase server coupled to the first interface and the second interface to:
receive a payment instruction from a web server of a vendor, wherein the web server offers a product to a customer via transmitting transaction details of a transaction to a web browser of the customer and receiving order details of an order from the web browser of the customer to initiate the payment instruction for a payment to be made by the customer to the vendor, wherein the order details include a payment amount and identify a mobile phone of the customer;
communicate, via text message through a carrier server with the mobile phone of the customer at the phone number to confirm the payment requested by the payment instruction;
determine a confirmation from the mobile phone of the customer in response to the communication;
determine, based on the payment amount requested by the payment instruction, a plurality of premium rate message codes corresponding to a plurality of premium text messages for transmission to a recipient, wherein each respective premium rate message code of the plurality of premium rate message codes is predefined by the carrier server of the mobile phone to charge a predetermined amount, the premium rate message codes including at least first and second premium rate message codes each for different predetermined amount, wherein the payment amount is divided by the purchaser server such that, in combination, the predetermined amounts of at least the first and second premium rate message codes add up to the payment amount; and
transmit through the carrier server of the mobile phone the plurality of premium text messages to the mobile phone of the customer at the phone number in response to the confirmation from the mobile phone, wherein the customer is to be charged on an account of the mobile phone held by the carrier server according to the predetermined amounts, including the first and second different amounts matching respectively the first and the second of the premium rate message codes, of the plurality of premium rate message codes of the plurality of premium text messages for a total of the payment amount.

20. A non-transitory computer-readable medium storing instructions which, when executed on a purchase server, cause the purchase server to perform a method, the method comprising:
receiving, in a purchase server, a payment instruction from a web server of a vendor, wherein the web server offers a product to a customer via transmitting transaction details of a transaction to a web browser of the customer and receiving order details of an order from the web browser of the customer to initiate the payment instruction for a payment to be made by the customer to the vendor, wherein the order details include a payment amount and identify a mobile phone of the customer;
communicating, by the purchase server via text message through a carrier server of a mobile phone of the customer at the phone number, to confirm the payment requested by the payment instruction;
receiving, at the purchase server, a confirmation from the mobile phone of the customer in response to the communication;
based on the payment amount requested by the payment instruction, a plurality of premium rate message codes corresponding to a plurality of premium text messages for transmission to a recipient, wherein each respective premium rate message code of the plurality of premium rate message codes is predefined by the carrier server of the mobile phone to charge a predetermined amount, the premium rate message codes including at least first and second premium rate message codes each for different predetermined amount, wherein the payment amount is divided by the purchaser server such that, in combination, the predetermined amounts of at least the first and second premium rate message codes add up to the payment amount; and transmitting, from the purchase server through the carrier server of the mobile phone, the plurality of premium text messages to the mobile phone of the customer at the mobile phone number in response to the confirmation from the mobile phone, wherein the customer is to be charged on an account of the mobile phone held by the carrier server according to the predetermined amounts, including the first and second different amounts matching respectively the first and the second of the premium rate message codes, of the plurality of premium rate message codes of the plurality of premium text messages for a total of the payment amount.

21. A method according to claim 1,
wherein a third of the predetermined amounts that add up to the payment amount is for an amount that is different to the first predetermined amount.

22. A method according to claim 21,
wherein the second and third predetermined amounts are for the same amount.

23. A method according to claim 22,
wherein the second and third predetermined amounts have the same message code.

24. A method according to claim 22,
wherein the second and third predetermined amounts are each larger than the first predetermined amount.

* * * * *